(12) United States Patent
Wang et al.

(10) Patent No.: US 10,132,979 B2
(45) Date of Patent: Nov. 20, 2018

(54) LAMP BAR FIXATION DEVICE AND BACKLIGHT SOURCE HAVING THE SAME

(71) Applicants: BOE TECHNOLOGY GROUP CO., LTD., Beijing (CN); HEFEI BOE DISPLAY LIGHTING CO., LTD., Hefei, Anhui (CN)

(72) Inventors: Xing Wang, Beijing (CN); Tongmin Liu, Beijing (CN); Wenbo Sun, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

(*) Notice: Subject to any disclaimer, the term of this patent is extended or adjusted under 35 U.S.C. 154(b) by 0 days.

(21) Appl. No.: 14/804,615

(22) Filed: Jul. 21, 2015

(65) Prior Publication Data

US 2016/0265752 A1  Sep. 15, 2016

(30) Foreign Application Priority Data

Mar. 13, 2015  (CN) .................. 2015 2 0145497 U

(51) Int. Cl.
*F21V 19/00* (2006.01)
*F21V 8/00* (2006.01)

(52) U.S. Cl.
CPC ............ *G02B 6/0011* (2013.01); *G02B 6/009* (2013.01)

(58) Field of Classification Search
CPC ..... F21V 21/005; F21V 21/025; F21V 21/042
See application file for complete search history.

(56) References Cited

U.S. PATENT DOCUMENTS

| 2012/0182747 A1* | 7/2012 | Doubek ................ F21V 17/164 362/390 |
| 2014/0233227 A1* | 8/2014 | Diekmann .............. F21V 17/12 362/225 |
| 2015/0159848 A1* | 6/2015 | Sieberth .................. F21V 23/06 362/311.02 |

\* cited by examiner

*Primary Examiner* — Anabel Ton
(74) *Attorney, Agent, or Firm* — Ladas & Parry LLP; Loren K. Thompson

(57) ABSTRACT

A lamp bar fixation device and a backlight source provided with the lamp bar fixation device are provided. The lamp bar fixation device comprises a back plate, a positioning clamp and a spacer, wherein the back plate is provided thereon with a positioning slot for receiving a lamp bar, the positioning clamp is positioned above the positioning slot, and the spacer is detachably mounted in the positioning clamp so as to fix the lamp bar. The lamp bar fixation device effectively improves assembling efficiency of the lamp bar and has a good heat dispersion performance. Meanwhile, the lamp bar fixation device facilitates the detachment of the lamp bar, and enables the lamp bar to be replaced without a risk of being damaged, and rework performance can be improved.

17 Claims, 3 Drawing Sheets

2

LAMP BAR FIXATION DEVICE AND BACKLIGHT SOURCE HAVING THE SAME

TECHNICAL FIELD

Embodiments of the present disclosure relate to a lamp bar fixation device and a backlight source provided with the lamp bar fixation device.

BACKGROUND

In various liquid crystal display devices such as a liquid crystal display and a liquid crystal TV set, an external light source is required to implement displaying, since liquid crystal cannot emit light itself. LED (Light Emitting Diode) backlight sources have become prevailing backlight sources at present, because they have advantages of good color rendering property and long service life and they are environment-friendly without mercury. LED backlight sources are classified into two types according to distribution positions of the LEDs, i.e., side-type and direct-type. In side-type backlight sources, LEDs are located at edges of a screen which is irradiated by a light guide plate, and such side-type backlight sources are mainly applied to large size display devices. In direct-type backlight sources, LEDs are distributed at the back of the screen in a dense array and directly irradiate the screen, and such direct-type backlight sources mainly applied to medium/small size display devices.

At present, in both cases of side-type backlight sources and direct-type backlight sources, a lamp bar and a back plate are usually connected and fastened to each other by double-sided adhesive tape or by screw. Assembling and aligning in such fastening connection are very complicated and the assembling efficiency is low. It often occurs that assembling has to be reworked for the reason that the lamp bar has not been installed in a proper position, in which it is very inconvenient to remove the lamp bar and the lamp bar is inclined to be damaged.

Therefore, in order to eliminate the above deficiencies, a lamp bar fixation device is needed. The lamp bar fixation device can facilitate assembling and aligning of the lamp bar, improve assembling efficiency, facilitate the detachment and improve rework efficiency. Further, a backlight source having the above process feature is needed.

SUMMARY

As least one embodiment of the present disclosure provides a lamp bar fixation device, comprising a back plate, a positioning clamp and a spacer, wherein the back plate is provided thereon with a positioning slot for receiving a lamp bar, the positioning clamp is positioned above the positioning slot, and the spacer is detachably mounted in the positioning clamp so as to fix the lamp bar.

In one embodiment of the present disclosure, a plurality of said positioning clamps are disposed and the plurality of positioning clamps are disposed at intervals along a lengthwise direction of the positioning slot.

In one embodiment of the present disclosure, the positioning clamp comprises a first turnover part and a second turnover part, the first turnover part and the second turnover part are oppositely disposed at both sides of the positioning slot and enclose a receiving space for receiving the spacer.

In one embodiment of the present disclosure, the first turnover part and the second turnover part each have a U-shaped sectional shape.

In one embodiment of the present disclosure, the positioning slot comprises a first half slot and a second half slot which are respectively disposed on the back plate in parallel, and a clearance is provided between the bottom of the first half slot and the bottom of the second half slot.

In one embodiment of the present disclosure, one end of the spacer is provided with a bent structure for catching the positioning clamp.

As least one embodiment of the present disclosure further provides a backlight source, comprising the lamp bar fixation device as described above.

In one embodiment of the present disclosure, the lamp bar fixation device is disposed at a lateral side of a screen and the screen is irradiated by means of a light guide plate.

In one embodiment of the present disclosure, a plurality of said lamp bar fixation devices are provided and the plurality of lamp bar fixation devices are distributed at the back of a screen in an array.

The lamp bar fixation device according to the embodiments of the present disclosure is provided with a positioning slot for receiving the lamp bar on the back plate and efficiently fixes the lamp bar by a positioning clamp and a spacer. Comparing with the conventional art, since no manual alignment by means of fastening tapes and screws is necessary, it is more convenient and more accurate to assemble and align the lamp bar, thereby effectively improving assembling efficiency. Moreover, the lamp bar fixation device has a large heat conducting area and thereby has good heat dispersion performance. Meanwhile, the lamp bar fixation device facilitates the detachment and the lamp bar can be replaced without removing the backlight source or even without removing the liquid crystal module, and thus the lamp bar will not be damaged and the rework performance will be improved.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

In the description of the present disclosure, unless otherwise indicated, "a plurality" means two or more than two. Positional or directional relationship indicated by terms of "upper", "lower", "left", "right", "inside", "outside", "front end", "rear end", "tip end", and "tail end" refers to positional or directional relationship based on the illustration of the drawings. It is intended to facilitate the description of the present disclosure and to simplify the description, rather than indicate or suggest that the device or element should have the particular orientation and configure and operate with the particular orientation and thus they cannot be construed as a limitation to the present disclosure. In addition, terms of "first", "second" and "third" and etc. are for purpose of illustration only, and cannot be understood as indicating or suggesting relative importance.

In the description of the present disclosure, it is noted that, unless otherwise indicated, terms of "connection", "attachment" should be understood in a broad way, for example, it can be a fixed connection or a detachable connection or an integral connection; it can be a mechanical connection, or an electrical connection; it can be a direct connection or an indirect connection by means of intermediate medium. Those skilled in the art would appreciate the meaning of the above terms in the present disclosure.

Figure 1:
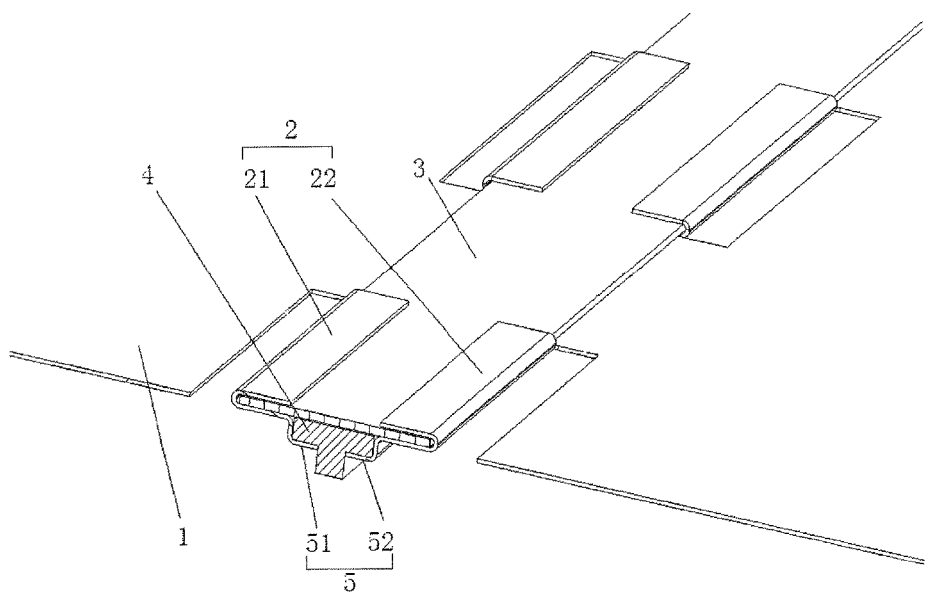
FIG. 1 is a front illustrative view of a lamp bar fixation device according to one embodiment of the present disclosure after being assembled.
Figure 2:
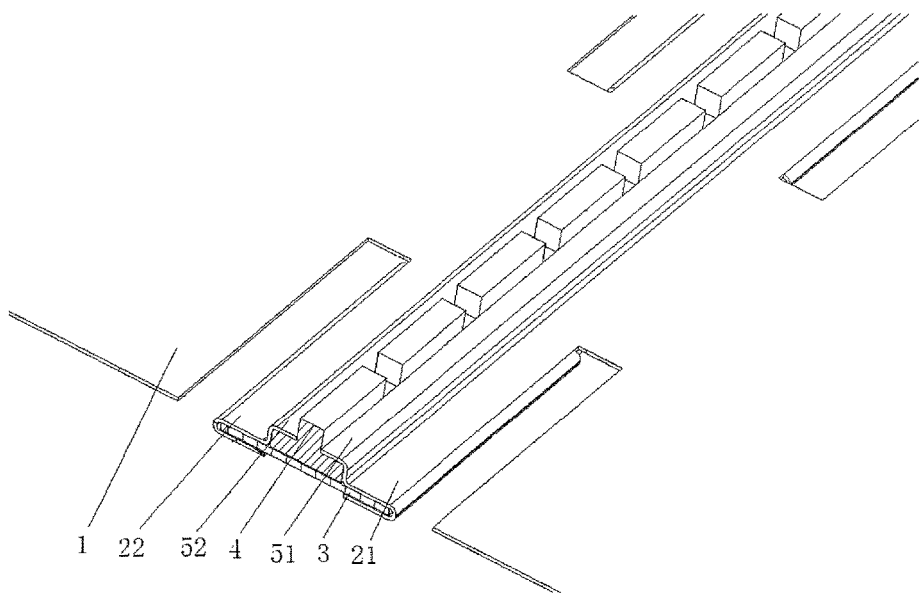
FIG. 2 is a back illustrative view of a lamp bar fixation device according to one embodiment of the present disclosure after being assembled.
Figure 3:
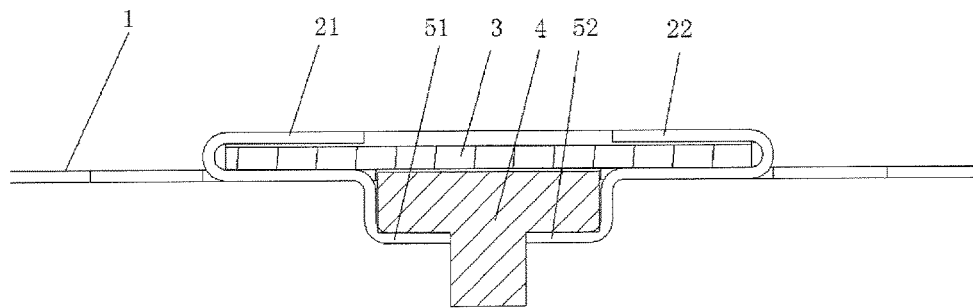
FIG. 3 is a section view of a lamp bar fixation device according to one embodiment of the present disclosure after being assembled.

As illustrated in FIG. 1 to FIG. 3, a lamp bar fixation device according to one embodiment of the present disclosure comprises a back plate 1, a positioning clamp 2 and a spacer 3. A positioning slot 5 for receiving a lamp bar 4 is provided on the back plate 1. It is illustrated in the figures that the back plate 1 located at both sides of the positioning slot 5 has been unfolded. Of course, the back plate 1 can be designed to have other shapes according to practical requirements. The positioning clamp 2 is positioned above the positioning slot 5. That is to say, the positioning clamp 2 forms, above the notch of the positioning slot 5, a limit space for restricting the spacer 3, so that the spacer 3 is detachably mounted in the positioning clamp 2, thereby fixing the lamp bar 4. The lamp bar fixation device addresses issues in the conventional art such as complicated assembling and aligning and low efficiency. Comparing with the conventional art, it is more convenient and more accurate to assemble and align the lamp bar 4 and no manual work by means of fastening devices such as fixing tapes and screws is necessary. Therefore, the assembling efficiency is improved effectively. Moreover, the lamp bar fixation device has a large heat conducting area and thereby has good heat dispersion performance. Meanwhile, the lamp bar fixation device facilitates the detachment of the lamp bar 4 and the lamp bar 4 can be replaced without removing the backlight source or even without removing the liquid crystal module, and thus the lamp bar 4 will not be damaged and the rework performance will be improved.

In the present embodiment, the number of the positioning clamps 2 is not limited to a certain number, and can be modified according to practical requirements. For example, where there are a plurality of positioning clamps 2, the positioning slot 5 is an elongate slot and the plurality of positioning clamps 2 are disposed at intervals along the lengthwise direction of the positioning slot 5. The plurality of positioning clamps 2 which are disposed at intervals not only aim to efficiently fasten the lamp bar 4, but also function to facilitate the heat dispersion of the lamp bar 4.

Further, in the present embodiment, the back plate 1 and the positioning clamp 2 are an integral structure and the positioning clamp 2 can be directly formed by a cutting process and a turnover process based on the back plate 1. Therefore, it is easy to be manufactured and cost efficient.

The positioning clamp 2 comprises a first turnover part 21 and a second turnover part 22. The first turnover part 21 and the second turnover part 22 are oppositely disposed at both sides of the positioning slot 5. That is to say, the first turnover part 21 is connected with an upper edge of one side of the positioning slot 5, and the second turnover part 22 is connected with an upper edge of the other side of the positioning slot 5. Moreover, the first turnover part 21 and the second turnover part 22 have openings facing each other after being folded towards each other, and enclose a receiving space for receiving the spacer 3 to facilitate quick inserting and pulling out of the spacer 3.

Further, the first turnover part 21 and the second turnover part 22 both have a U-shaped sectional shape. The design of U-shaped turnover part can increase the area for heat conducting and improve heat dispersion performance, and at the same time, has an advantage of easy production in which a making is done just by having a part of the back plate 1 turned over towards the inside.

The spacer 3 is shaped and sized to match the positioning clamp 2. The spacer 3 can be made of a metallic material so as to further improve heat dispersion performance. Of course, the spacer 3 can be made of other materials.

Figure 4:
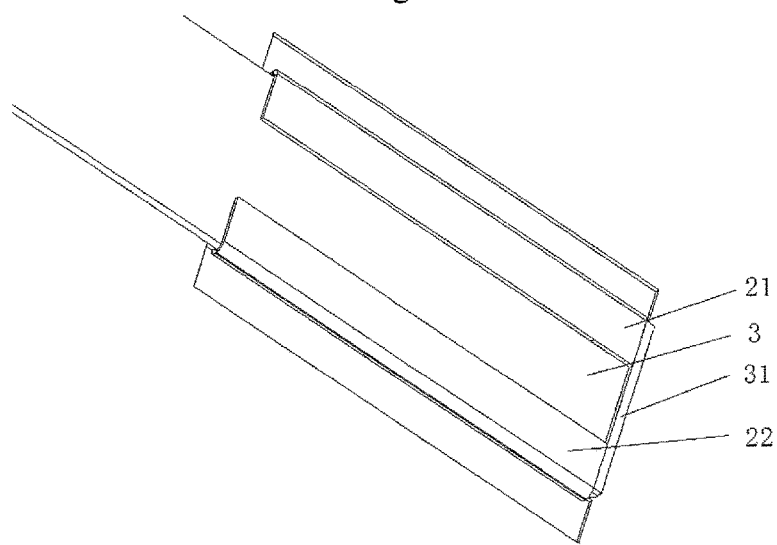
FIG. 4 is a structural illustrative view of a bent structure according to one embodiment of the present disclosure.

As illustrated in FIG. 4, the design of the spacer 3 can be further optimized. One end of the spacer 3 is provided with a bent structure 31 for catching the positioning clamp 2. The bent structure 31 can make the detachment convenient.

Figure 5:
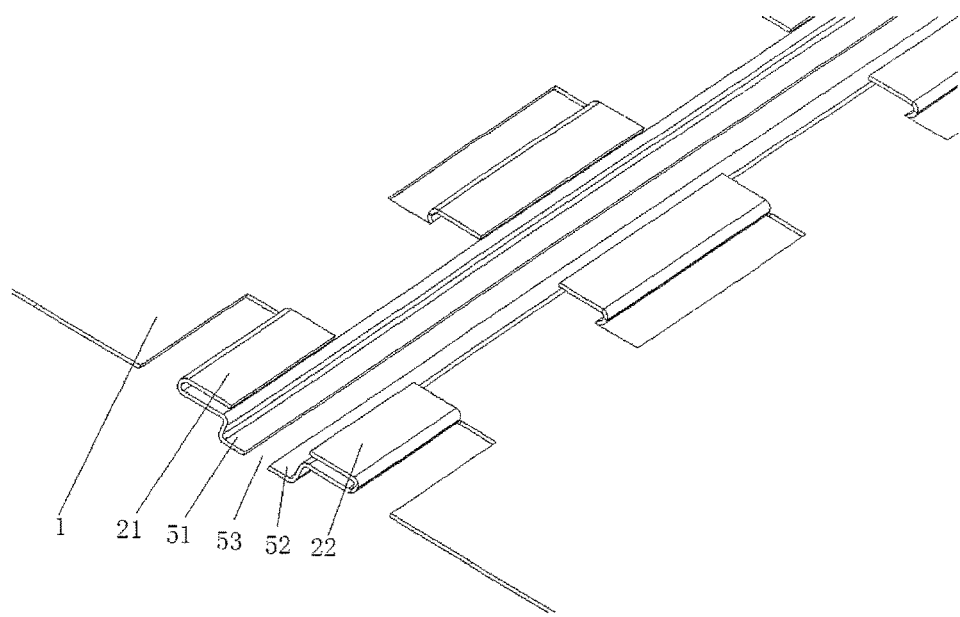
FIG. 5 is a structural illustrative view of a back plate according to one embodiment of the present disclosure and FIG. 6 is a section view of a back plate according to one embodiment of the present disclosure.
Figure 6:
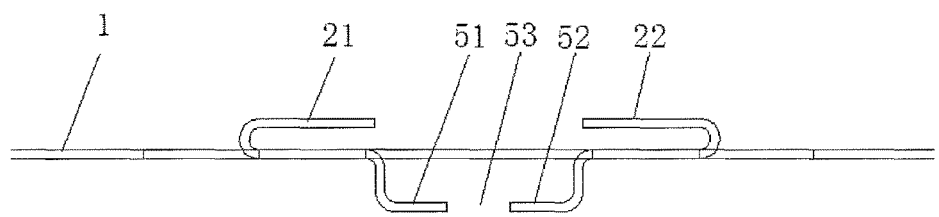

As illustrated in FIG. 5 and FIG. 6, in one embodiment, the positioning slot 5 has a first half slot 51 and a second half slot 52 which are respectively disposed on the back plate 1 in parallel. The shape of the first half slot 51 and the second half slot 52 is a shape obtained by cutting general U-shaped slot (a bent structure) along its midline. There is a clearance 53 between the bottom of the first half slot 51 and the bottom of the second half slot 52, which means that the slot bottom of the positioning slot 5 is hollow. Such design causes LEDs on the lamp bar 4 to be located at the clearance 53 and thus LEDs will not be covered so that LEDs will not be touched in the course of inserting and pulling out the lamp bar. Therefore, the overall structure is more feasible and compact.

In one embodiment of the present disclosure, the assembling and detaching method of the lamp bar fixation device will be as follows. At the time of assembling, firstly, the lamp bar is fitted into the positioning slot of the back plate, wherein the length, width and depth of the positioning slot matching the length, the width and the thickness of the lamp bar substrate; and then a spacer is inserted into a plurality of positioning clamps 2 on the back plate, the spacer being sized to match the positioning clamp 2; thereby accomplishing the positioning and fixing of the lamp bar on spatial positions (in XYZ directions). At the time of detaching, the spacer is pulled out firstly and then the lamp bar is removed, thereby achieving an replacement of the lamp bar without removing the backlight source or even without removing the liquid crystal module.

At least one embodiment of the present disclosure further provides a backlight source which comprises the lamp bar fixation device as described above. The lamp bar can be stably fastened by the lamp bar fixation device without any fastening tape or screw and without manual alignment, which significantly improves assembling efficiency.

The backlight sources are classified into a side-type backlight source and a direct-type backlight source according to distribution positions of the LEDs of the lamp bar. The lamp bar fixation device according to embodiments of the present disclosure can be applied to any one of these two types of backlight sources.

If the backlight source is of side-type, the lamp bar fixation device is disposed at lateral side of the screen and a plane light source is formed on the screen by a light guide plate to irradiate the whole screen. This is typically applied to large size backlight display devices.

If the backlight source is of direct-type, there are a plurality of lamp bar fixation devices which are distributed at the back of the screen in a dense array and directly irradiate the screen. This is mainly applied to medium/small size backlight display devices.

To sum up, the lamp bar fixation device according to the embodiment of the present disclosure is provided with a positioning slot for receiving the lamp bar on the back plate and efficiently fastens the lamp bar by a positioning clamp and a spacer. Comparing with conventional arts, since no manual alignment by means of fastening devices such as fastening tapes and screws is necessary, it is more convenient and more accurate to assemble and align the lamp bar in the lamp bar fixation device. Therefore, assembling efficiency is improved efficiently. Moreover, the lamp bar fixation device has a large heat conducting area and thus has good heat dispersion performance. Meanwhile, the lamp bar fixation device facilitates detachment and the lamp bar can be replaced without removing the backlight source or even without removing the liquid crystal module, and thus the lamp bar will not be damaged and the rework performance will be improved.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201520145497.6 filed on Mar. 13, 2015, the disclosure of which is hereby entirely incorporated by reference as a part of the present application.

The invention claimed is:

1. A lamp bar fixation device, comprising a back plate, a positioning clamp and a spacer, wherein the back plate is provided thereon with a positioning slot for receiving a lamp bar, the positioning clamp is positioned above the positioning slot, the spacer is detachably mounted in the positioning clamp, and the spacer and the positioning clamp are fitted with each other in a contact manner so as to fix the lamp bar therebetween.

2. The lamp bar fixation device according to claim 1, wherein a plurality of the positioning clamps are disposed and the plurality of positioning clamps are disposed at intervals along a lengthwise direction of the positioning slot.

3. The lamp bar fixation device according to claim 1, wherein the positioning clamp comprises a first turnover part and a second turnover part, the first turnover part and the second turnover part are oppositely disposed at both sides of the positioning slot and enclose a receiving space for receiving the spacer.

4. The lamp bar fixation device according to claim 3, wherein the first turnover part and the second turnover part each has a U-shaped sectional shape.

5. The lamp bar fixation device according to claim 1, wherein the positioning slot comprises a first half slot and a second half slot which are respectively disposed in parallel on a side of the back plate away from the positioning clamp and disposed to confront each other, and a clearance is provided between the first half slot and the second half slot.

6. The lamp bar fixation device according to claim 1, wherein one end of the spacer is provided with a bent structure for catching the positioning clamp.

7. The lamp bar fixation device according to claim 2, wherein the positioning clamp comprises a first turnover part and a second turnover part, the first turnover part and the second turnover part are oppositely disposed at both sides of the positioning slot and enclose a receiving space for receiving the spacer.

8. The lamp bar fixation device according to claim 2, wherein the positioning slot comprises a first half slot and a second half slot which are respectively disposed in parallel on a side of the back plate away from the positioning clamp and disposed to confront each other, and a clearance is provided between the first half slot and the second half slot.

9. The lamp bar fixation device according to claim 3, wherein the positioning slot comprises a first half slot and a second half slot which are respectively disposed in parallel on a side of the back plate away from the positioning clamp and disposed to confront each other, and a clearance is provided between the first half slot and the second half slot.

10. The lamp bar fixation device according to claim 4, wherein the positioning slot comprises a first half slot and a second half slot which are respectively disposed in parallel on a side of the back plate away from the positioning clamp and disposed to confront each other, and a clearance is provided between the first half slot and the second half slot.

11. The lamp bar fixation device according to claim 2, wherein one end of the spacer is provided with a bent structure for catching the positioning clamp.

12. The lamp bar fixation device according to claim 3, wherein one end of the spacer is provided with a bent structure for catching the positioning clamp.

13. The lamp bar fixation device according to claim 4, wherein one end of the spacer is provided with a bent structure for catching the positioning clamp.

14. The lamp bar fixation device according to claim 5, wherein one end of the spacer is provided with a bent structure for catching the positioning clamp.

15. A backlight source, comprising the lamp bar fixation device according to claim 1, wherein the backlight source further comprises a lamp bar, which comprises at least one OLED and is disposed in the positioning slot.

16. The backlight source according to claim 15, wherein the lamp bar fixation device is disposed at a lateral side of a screen, and a plane light source is formed on the screen by a light guide plate to irradiate the whole screen, where the backlight source is applicable to a large size backlight display device.

17. The backlight source according to claim 15, wherein a plurality of said lamp bar fixation devices are provided and the plurality of lamp bar fixation devices are distributed at the back of a screen in a dense array, where the backlight source is applicable to a medium/small size display device.

* * * * *